United States Patent [19]
Williams

[11] Patent Number: 5,105,460
[45] Date of Patent: Apr. 14, 1992

[54] PLUG-IN TELEPHONE FACILITY

[76] Inventor: John S. Williams, 1730 Garretson Ave., Corona, Calif. 91719

[21] Appl. No.: 667,223

[22] Filed: Mar. 11, 1991

[51] Int. Cl.⁵ .................. H04M 1/11; H04M 17/02
[52] U.S. Cl. .................................. 379/155; 379/61; 379/434; 379/440; 379/454
[58] Field of Search ............... 379/155, 58, 61, 428, 379/429, 434, 437, 440, 451, 453, 454, 457

[56]  References Cited
U.S. PATENT DOCUMENTS 4,254,308 3/1981 Blomeyer et al. ............ 379/454
4,411,485 10/1983 Niseheart et al. .......... 379/454 X
4,432,522 2/1984 Pruente et al. .............. 379/454 X Primary Examiner—Stafford D. Schreyer
Attorney, Agent, or Firm—Roy A. Ekstrand

[57] ABSTRACT

A plug-in telephone facility includes conventional telephone communication apparatus together with a conventional coin-operated mechanism supported within a housing enclosure. A plurality of telephone plug receptacles are supported within the housing and may be accessed by a user's personal telephone communication device. Embodiments are shown which provide alternatives to a conventional pay telephone as well as convenient roadside facilities accessible from a motor vehicle.

6 Claims, 2 Drawing Sheets

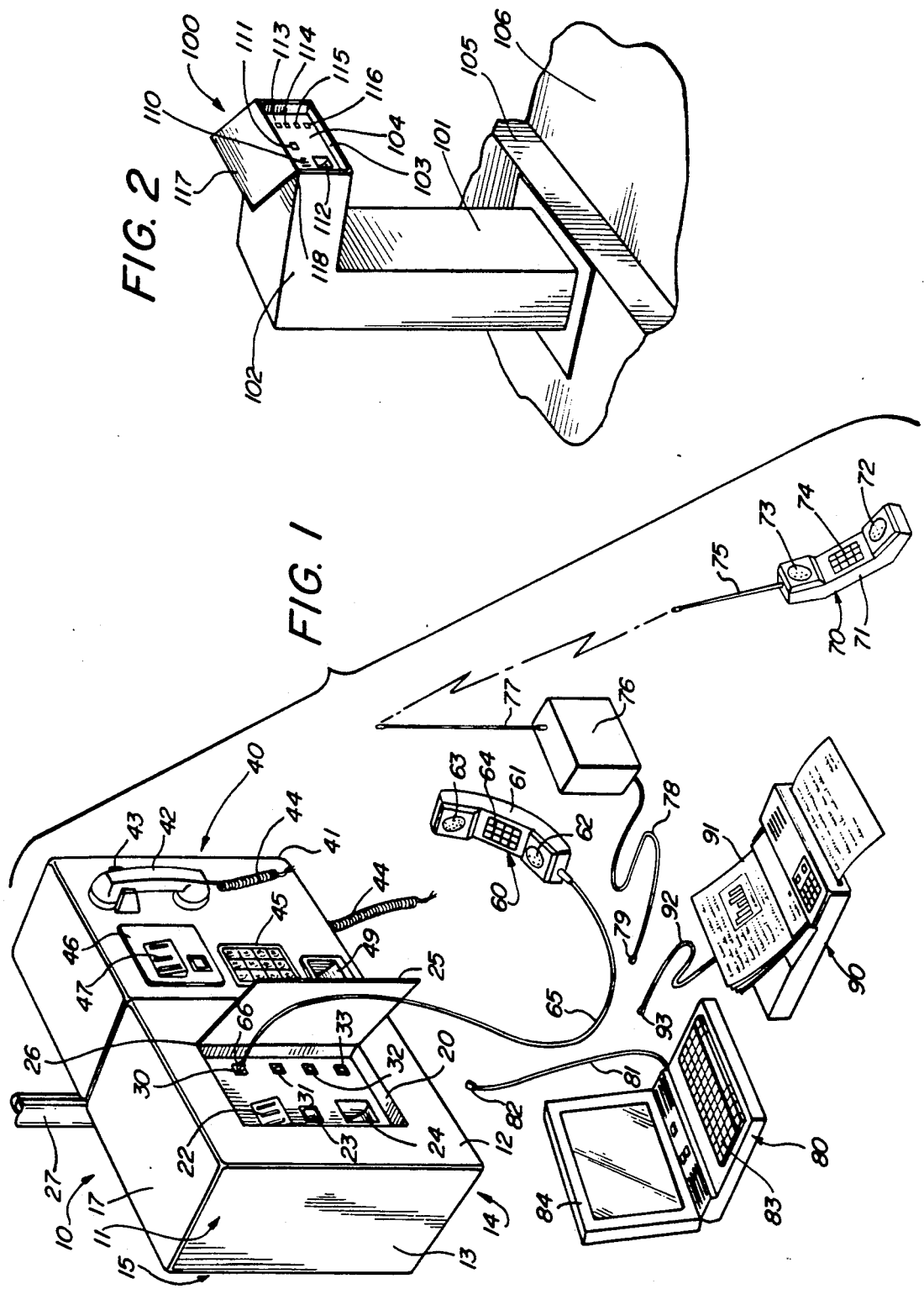

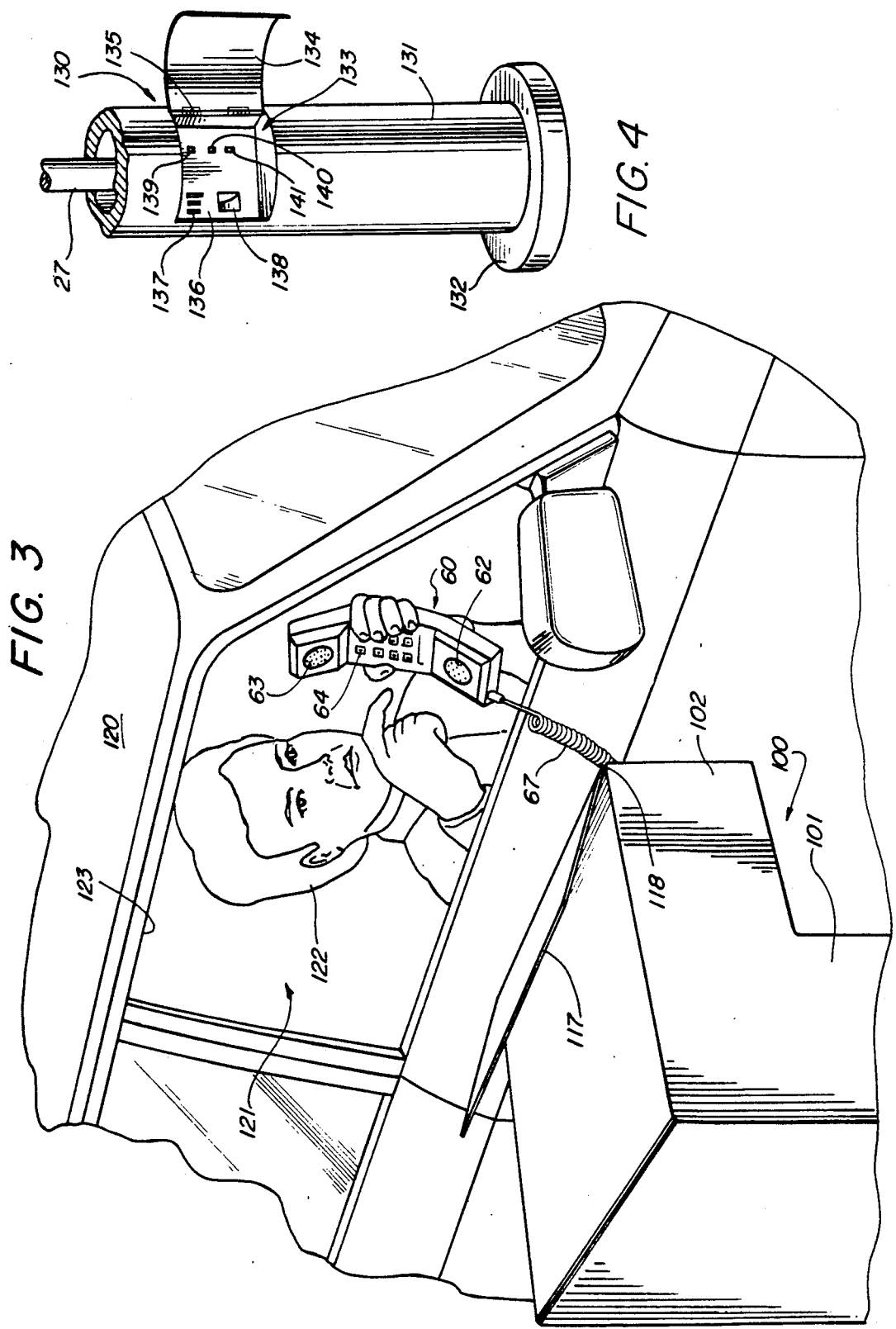

PLUG-IN TELEPHONE FACILITY

FIELD OF THE INVENTION

This invention relates generally to telephone systems and particularly to those available for public access.

BACKGROUND OF THE INVENTION

The familiar pay phone or public telephone has become extremely pervasive and, through the years, has been fabricated using a number of different constructions. While the specific construction details of such pay phones or public telephones may have varied, generally all includes a basic telephone unit supporting a coin operated mechanism and a telephone dialer. A handset is coupled to the main telephone unit by a cable and includes both a speaker for listening as well as a microphone for speaking. Originally public or pay telephones were found almost exclusively within privacy booths generally referred to as phone booths. However, under economic pressures, the telephone companies installing such public phones drifted toward public telephone installations which avoided the use of expensive space consuming private phone booths in favor of multiple pay phone installations separated by partial wall dividers or dividing panels.

In many situations and in many neighborhoods, the presence of pay telephones provide a number of extremely necessary and desirable services. The availability of such pay phones often provides a critical emergency communication system for persons out on the street or in the neighborhoods. Similarly, traveling motorists, having encountered operating difficulties or other problems, often seek the much needed emergency roadside communications of a nearby public or pay telephone. In addition to emergency uses and situations, public telephones often provide the sole communication link or inhabitance of extremely poor neighborhoods in which the possession of installed telephone service within the home is an unaffordable luxury. Such persons often rely upon the communications access to public telephones for many support services. In addition, a variety of business users such as sales personnel covering their particular territories rely heavily on the availability of public telephones. Finally, younger people, particularly those in their teens, often seek the local public telephone as a more private facility from which to make their often extended social telephone calls.

While there is no doubt that public telephones provide a variety of necessary services and highly desirable opportunities for communications, the provision and maintenance of such public telephones has been subjected to a number of problems. One problem arises out of the high usage which such public phones often receive in that the ordinary wear and tear on the telephone, the telephone dialer and the coin operating mechanism requires substantial maintenance activities. In addition, such phones are often subjected to adverse weather conditions and exposure. In addition to ordinary wear and tear, a growing trend within the community has subjected public telephones to destructive vandalism and attempts at the theft therefrom. Frequently vandals find apparent enjoyment in destroying such public telephones by cutting the handset connecting cord or otherwise damaging the mechanism. Attempts at theft from public phones generally focus upon highly destructive efforts to liberate the coin reservoir from the coin operated mechanism.

In addition to problems of vandalism and wear and tear, public telephones are subjected to the various conditions of poor sanitation and disease which beset many of the users. Since public telephones are often used in high noise environments such as parking lots, street corners and the like, users tend to maintain the microphone and speaker in close proximity to their head and mouth. Thus, successive users are often subjected to the hygiene and disease problems of previous users. As the use of protective telephone booths became less and less prevalent, users of public telephones often find themselves subjected to adverse weather conditions when using public telephones.

In attempts to meet the variety of problems which have beset the public telephone, practitioners in the art have attempted to strengthen the telephone unit against vandalism and theft. Often manufacturers protect the handset connecting cable with a metal armored shield to discourage vandalism directed at cutting the handset cable. In addition, the physical housing which supports the coin operated unit is often stregthened and reinforced to discourage breaking and damage. In addition, the severe econmic pressures upon the continued provision of public telephones has prompted practitioners in the art to develop more economical and low cost fabrication techniques.

Despite these concerted efforts, however, the combined costs and difficulties are gradually diminishing the number of public telephones installed and maintained. Thus, a danger exists that this vital communication facility will slowly disappear from many areas where it is needed the most.

In addition to the conventional pay phone provided by practitioners in the art, other forms of access to telephone facilities have been provided. U.S. Pat. No. 4,752,232 issued to DeLuca sets forth a LOCKING DEVICE FOR TELEPHONE SUBSCRIBER PLUGS designed to prevent unauthorized access to a telephone subscriber circuit jack of the type located at a building entrance terminal or structure. The jack accommodates a plug having a manually engageable release member and defines a recess accommodating the jack. The locking device includes a housing element defining a generally rectangular enclosed recess. Means within the recess locate the plug in a predetermined position. A forward wall in the housing defines an opening opposite the plug which provides access. A cover element is supported upon the housing and is movable between open and closed positions.

U.S. Pat. No. 3,096,404 issued to Semon sets forth a TELEPHONE SWITCHBOARD PATCHING UNIT which enables telephone switchboard operators to connect an incoming call with an outgoing call. A pair of telephone connections provide the appropriate coupling between sources of incoming and outgoing calls. Switching circuitry within the patching unit provide appropriate electrical connections.

U.S. Pat. No. 4,613,732 issued to Cwirzen, et al. sets forth an INTERFACE MODULE WITH MODULAR JACK FOR TELECOMMUNICATIONS SYSTEMS which comprises a module for connection to the incoming telephone lines and having a modular jack for plugging into one of the incoming lines. The module provides a plug in arrangement and incorporates line protectors. A socket recess within the module is adapted to receive a conventional telephone plug to provide connection to the interfaced telephone line.

While the foregoing described prior art devices as well as the conventional public telephone have provided means of access to telephone communications, there remains a continuing need in the art for a suitable replacement or supplement for conventional interface telephone devices and public or pay telephones.

SUMMARY OF THE INVENTION

Accordingly, it is a general object of the present invention to provide an improved telephone facility. It is a more particular object of the present invention to provide an improved telephone facility which presents an alternative to conventional public telephones. It is a still more particular object of the present invention to provide an improved plug-in telephone facility which avoids many of the costs and difficulties associated with conventional public or pay telephones.

In accordance with the present invention, there is provided for use in combination with a user-provided telephone having a telephone connecting plug for communication with a telephone line, a plug-in telephone facility comprises: a housing defining an interior cavity; a support panel for supporting a coin-operated mechanism; and a plurality of telephone plug receptacles cooperating with the telephone connecting plug supported upon the support panel.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a plug-in telephone facility constructed in accordance with the present invention;

FIG. 2 sets forth a perspective view of an alternative embodiment of the present invention plug-in telephone facility;

FIG. 3 sets forth a partially sectioned perspective view of the present invention plug-in telephone facility in a typical user situation; and FIG. 4 sets forth a perspective view of a still further alternate embodiment of the present invention.

DESCRIPTION OF THE PREFERRED EMBODIMENTS

FIG. 1 sets forth a perspective view of a plug-in telephone facility constructed in accordance with the present invention and generally referenced by numeral 10. Telephone facility 10 is shown supported in combination with a conventional pay telephone 40. Specifically, plug-in telephone facility 10 includes a generally rectangular housing 11 defining a front surface 12, a pair of side surfaces 13 and 16, a bottom surface 14, a rear surface 15 and a top surface 17 forming in combination closed housing 11. Front surface 12 further defines a generally rectangular interior cavity 20 supporting a generally planar panel 21. A conventional coin receiver mechanism 22 is supported by panel 21 and includes a coin return button 23 and a coin return receptacle 24. In accordance with an important aspect of the present invention, a plurality of telephone plug receptacles 30, 31, 32 and 33 are supported within interior cavity 20 by panel 21. A generally planar door 25 is pivotally secured to front portion 12 of housing 11 by a conventional hinge 26. Door 25 is pivotally movable about hinge 26 between the open position shown in FIG. 1 and a closed position shown covering interior cavity 20. In its preferred form, housing 11 and door 25 cooperate to provide a secure weather-proof protective enclosure for plug receptacles 30 through 33 as well as coin receiver mechanism 22.

A telephone 60, constructed in accordance with conventional fabrication techniques, includes a handset 61 supporting a microphone 62 and a speaker 63. Handset 61 further supports a conventional keypad 64. A cable 65 is coupled to handset 61 at one end and terminates at the other end in a telephone plug 66. Plug 66 is configured to be received within plug receptacle 30 in a cooperative arrangement within which telephone 60 is coupled to plug-in telephone facility 10.

In accordance with conventional fabrication techniques, housing 11 supports conventional telephone circuitry (not shown) which cooperate with coin receiver mechanism 22 to couple a selected one of plugs 30 through 33 to an operative telephone line 27.

Conventional pay phone 40 includes a generally rectangular housing 41 supporting a handset cradle 43 which in turn supports a handset 42. A cable 44 couples handset 42 to conventional telephone circuitry (not shown) within housing 41 in accordance with conventional fabrication techniques. For purposes of illustration, cable 44 is shown damaged and thus conventional pay phone 40 is rendered inoperative. Pay phone 40 further includes a coin-operated mechanism 46 having a plurality of coin insertion slots 47, a return button 48, a dial keypad 45 and a coin return receptacle 49. It should be understood that conventional pay phone 40 is fabricated in accordance with conventional fabrication techniques and includes conventional telephone circuitry within housing 41 (not shown) which provides telephone connection to a main telephone line 27.

In the anticipated use of plug-in telephone facility 10, the user has provided a personal telephone 60 having a conventional plug 66 at the end of connecting cable 65. Thus, in the anticipated use of the present invention telephone facility, the user simply opens door 25 and inserts plug 66 in the desired one of receptacles 30 through 33. Thereafter, in accordance with typical pay telephone operation, the user may alternatively operate keypad 64 to summon an operator, direct dial a credit card call or insert the required coin combination within coin receiver 22 to activate the connection between the selected plug receptacle 30 and telephone line 27. Thereafter telephone 60 may be used in the desired manner by the user. At the completion of the call or calls by the user, plug 66 is removed from plug receptacle 30 and the user goes about his or her business taking their personal telephone 60 with them.

Thus, in accordance with an important aspect of the present invention, plug-in telephone facility 10 cooperates with the user's personal telephone to provide convenient connection to telephone line 27 without the maintenance and repair problems associated with handset 42 and cable 44 of a conventional telephone facility such as pay phone 40. It should be noted that, because the user employs telephone facility 10 to provide connection between his or her personal telephone 60 via plug 66 and receptacles 30 through 33, the above-mentioned problems of hygiene and disease communication which the user would be subjected in using handset 42 of conventional pay phone 40 are avoided. In addition, while conventional pay phone 40 is rendered unusable and inoperative by the vandalism or other damage to cable 44, the present invention plug-in telephone facility 10 remains operative since the user provides the connecting cable.

FIG. 1 further sets forth other communicating devices of the type well known in the art which may also be used in combination with plug-in telephone facility 10. For example, a radio coupled telephone 70 which may alternatively be a cordless-type telephone or a different type of radio link communicating telephone such as a cellular telephone, includes a handset 71 supporting a microphone 72, a speaker 73 and a keypad dialer 74. In addition, radio coupled telephone 70 further includes an antenna 75. It will be apparent to those skilled in the art that phone 70 includes conventional radio communication apparatus (not shown) which may readily be constructed in accordance with conventional fabrication techniques.

A cooperating receiver 70 includes an antenna 77 and supports internal apparatus (not shown) which is constructed in accordance with conventional fabrication techniques and which cooperates with radio coupled telephone 70 to complete the telephone communication between phone 70 and a cable 78. Cable 78 terminates in a plug 79 which is compatible with a selected one of plug receptacles 30 through 33 of telephone facility 10.

Thus, with plug 79 of receiver 76 inserted into the selected one of plug receptacles 30 through 33, the user may thereafter employ radio coupled telephone 70 in accordance with its standard operation to provide completed telephone calls through telephone facility 10 to telephone line 27. An added convenience of the use of a radio coupled telephone such as telephone 70 permits the user to leave receiver 76 at telephone facility 10 and move to a more convenient place such as a place sheltered from the elements or adverse noise ambient.

Similarly, FIG. 1 shows a conventional facsimile machine 90 used to communicate the contents of a plurality of documents 91 to a telephone line via a cable 92 and a plug 93. Facsimile 90 may be used in combination with the present invention telephone facility by simply plugging plug 93 into a selected one of plug-in receptacles 30 and thereafter operating facsimile machine 90 in accordance with its normal operative techniques. Finally, a conventional computer 80 including a conventional telephone communication modem (not shown) further includes a display 84 and a plurality of input keys 83 as well as a cable 81 terminating in a plug 82. In accordance with its normally intended use, computer 80 may be coupled to telephone facility 10 by inserting plug 82 into a selected one of plug receptacles 30 through 33.

It will be apparent to those skilled in the art that telephone facility 10 may be used in combination with virtually any conventional telephone communication device. Thus, telephone facility 10 provides a convenient plug-in facility which may be accessed in a similar manner to conventional pay telephone 40 without the attendant difficulties associated with vandalism and wear and tear upon the conventional pay telephone.

FIG. 2 sets forth a perspective view of an alternate embodiment of the present invention plug-in telephone facility generally referenced by numeral 100. Telephone facility 100 includes a support base 101 supported in proximity to a curb 105 on the outer edge of a road 106. Support base 101 further includes an extension 102 which extends outwardly above curb 105 and road 106 to facilitate access by occupants of motor vehicles. Extension 102 defines an interior cavity 103 supporting a generally planar panel 104. Panel 104 supports a coin operating mechanism 110, a coin return button 111 and a coin receptacle 112. Panel 104 further supports a plurality of plug-in receptacles 113 through 116. In accordance with the descriptions sets forth above in connection with FIG. 1, it should be understood that receptacles 113 through 116 are structured to be compatible with a cooperating telephone plug such as plug 66 on cable 65 (seen in FIG. 1). It should be further apparent that coin mechanism 110, return button 111 and coin receptacle 113 function in accordance with conventional coin operating techniques. Conventional telephone circuitry (not shown) within extension 102 and support base 101 provide for telephone connection between receptacles 113 through 116 and a main telephone line (not shown). A generally planar door 117 is pivotally secured to extension 102 by a hinge 118. Door 117 may be pivoted about hinge 118 to the open position shown in FIG. 2 in which access to panel 104 is provided or, alternatively, pivoted downwardly about hinge 118 to provide a weather-tight covering to protect the interior of cavity 103.

In operation and in accordance with FIG. 3 described below, plug-in telephone facility 100 is configured to provide the above-described plug-in telephone use in a manner conveniently accessible to occupants of motor vehicles upon road 106. Thus, in its anticipated use, the user simply pulls up alongside curb 105 and reaches outwardly from the motor vehicle to plug a telephone such as telephone 60 in FIG. 1 to a selected one of plug receptacles 113 through 116. Thereafter, the telephone provided by the user may be used in accordance with conventional techniques.

FIG. 3 sets forth a partially sectioned perspective view of plug-in telephone facility 100 in a typical operative environment by a user 122. As described above, facility 100 includes a support base 101 and an extension 102. A protective door 117 is pivotally secured to extension 102 by a hinge 118. A typical user 122 is seated within an automobile or other similar vehicle generally referenced by numeral 120. Vehicle 120 defines an interior passenger compartment 121 within which user 122 is seated. Vehicle 120 further defines a window opening 123 through which user 122 has convenient access to extension 102 of telephone facility 100. A personal telephone 60 provided by the user is constructed in accordance with conventional fabrication techniques and, as described above, includes a handset 61 supporting a microphone 62, a speaker 63 and a keypad 64. A cable 67 extends from telephone 60 and, as is set forth above in FIG. 1, may be plugged into a convenient one of the plurality of receptacles 113 through 116 (seen in FIG. 2).

In the anticipated use shown in FIG. 3, the user simply parks vehicle 120 near plug-in telephone facility 100, rolls downs the vehicle window exposing window opening 123 and thereafter plugs cable 67 into a selected one of receptacles 113 through 116. Thereafter, user 122 places and completes one or more telephone calls in accordance with the otherwise standard operation of telephone 60. Once the user has completed the desired call or calls, cable 67 is removed from the receptacle within plug-in facility 100 and the user retains telephone 60 for future use.

FIG. 4 sets forth a still further alternate embodiment of the present invention plug-in telephone facility generally referenced by numeral 130. A telephone or utility pole 131 is constructed in accordance with the present invention and supported by a conventional support base 132. In accordance with the invention, telephone or utility pole 131 defines an interior cavity 133 supporting a generally planar panel 136 therein. A door 134 is pivotally secured to pole 131 by a hinge 135. Door 134 is pivotable between the open position shown in FIG. 4 and a closed position in which interior cavity 133 is protected from adverse weather or other sources of damage. A conventional coin operated mechanism 137 includes a coin return 138 and is supported by panel 136. A plurality of telephone plug receptacles 139 through 141 are supported by panel 136 within interior cavity 133. In accordance with the above-mentioned conventional fabrication techniques, plug receptacles 139 through 141 are coupled to telephone line 27 supported by pole 131 via coin operated mechanism 137.

While telephone facility 130 operates in the manner set forth above for telephone facilities 10 and 100 (seen in FIGS. 1 through 3), the physical configuration of telephone facility 130 provides a convenient and advantageous structure which is integral with telephone or utility pole 131. The object of the embodiment shown in FIG. 4 of the present invention plug-in telephone facility is to avoid the wasted space and increased cost of providing a separate telephone facility housing. In all other respects, however, telephone facility 130 operates in accordance with the above-described characteristics for plug-in telephone facilities 10 and 100.

What has been shown is a telephone plug-in facility which permits users to access a main telephone line using a personal telephone or other communication device. The plug-in facility provided avoids many of the problems associated with wear and tear and vandalism damage which have thus far plagued conventional public telephones.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in combination with a user-provided telephone having a telephone connecting plug for communication with a telephone line, a plug-in telephone facility comprising:
    a housing defining an interior cavity;
    a support panel for supporting a coin-operated mechanism; and
    a plurality of telephone plug receptacles cooperating with said telephone connecting plug supported upon said support panel.

2. A plug-in telephone facility as set forth in claim 1 wherein said housing includes a movable door movable between a closed position overlying said cavity and an open position exposing it.

3. A plug-in telephone facility as set forth in claim 2 wherein said housing includes a vertical support and a horizontally extending extension to facilitate roadside access to said interior cavity.

4. A plug-in telephone facility as set forth in claim 1 wherein said housing is integrally formed in a vertical pole.

5. A plug-in telephone facility as set forth in claim 1 wherein said housing is shaped to correspond to a rectangular prism.

6. A plug-in telephone facility having a plurality of telephone plug receptacles and coin operated connection means for coupling a selected one of said telephone plug receptacles to a telephone line.

* * * * *